E. M. BOGGESS.
CASTING GUN AND REEL.
APPLICATION FILED MAY 12, 1921.
1,434,768.
Patented Nov. 7, 1922.
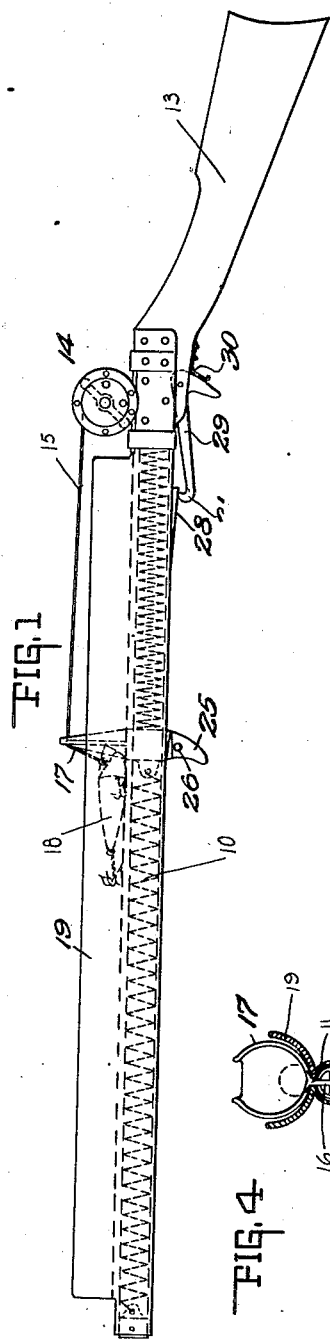
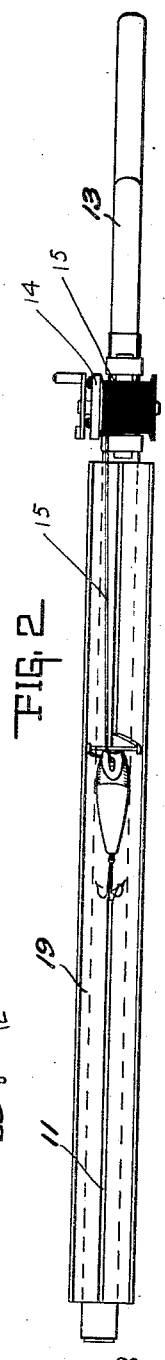
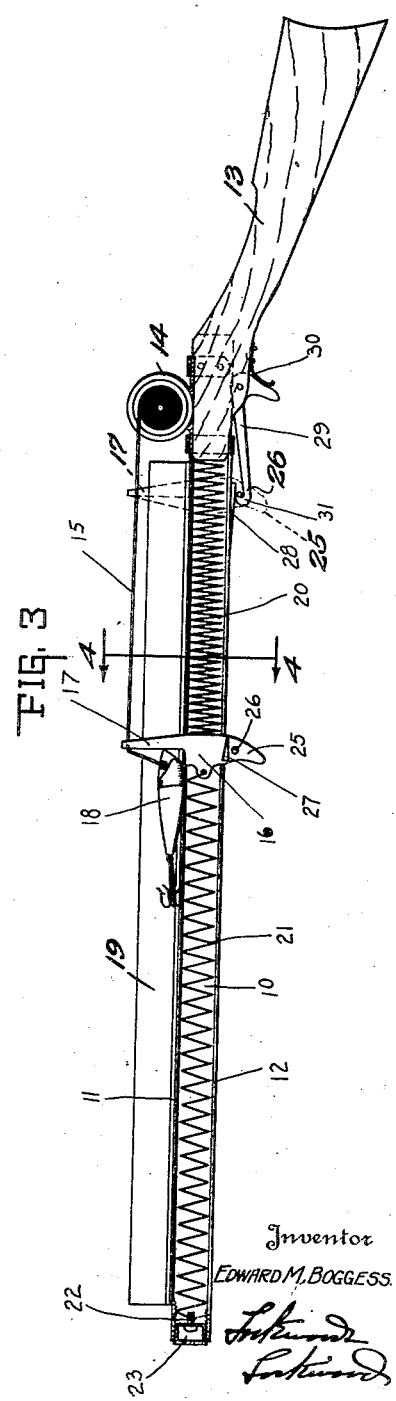
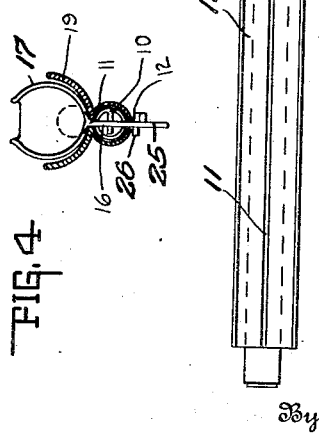
Inventor
EDWARD M. BOGGESS.
By
Attorneys Patented Nov. 7, 1922.

1,434,768

UNITED STATES PATENT OFFICE.

EDWARD M. BOGGESS, OF ELWOOD, INDIANA.

CASTING GUN AND REEL.

Application filed May 12, 1921. Serial No. 468,931.

*To all whom it may concern:*

Be it known that I, EDWARD M. BOGGESS, a citizen of the United States, and a resident of Elwood, county of Madison, and State of Indiana, have invented a certain new and useful Casting Gun and Reel; and I do hereby declare that the following is a full, clear, and exact description thereof, reference being had to the accompanying drawings, in which like numerals refer to like parts.

This invention relates to a fishing rod and reel for casting purposes.

The chief object of the invention is to provide means associated with the rod and reel, whereby the bait and line will be projected or thrown without the casting movement of the rod, as heretofore employed.

Another object of the invention is to provide the rod of such form that the same is more readily adapted to the casting or projecting of the bait and line than the usual rod will be so adapted.

The chief feature of the invention consists in associating with a gun-like rod and casting reel, a suitable means on said rod for casting or throwing the bait and line in an improved manner.

Another feature of the invention consists in the several means including the trough or guide means for the bait, the releasing means and the initial retarding means, as well as the adjustment of the power means, all as applied to a gun-like fishing rod.

The full nature of the invention will be understood from the accompanying drawings and the following description and claims.

In the drawings, Fig. 1 is a side elevational view of the invention, parts thereof being shown in full lines and other parts dotted in an intermediate position. Fig. 2 is a top plan view thereof with a suitable bait. Fig. 3 is a longitudinal sectional view of the invention. Fig. 4 is a transverse sectional view taken on the line 4—4 of Fig. 3 and in the direction of the arrows.

In the drawings 10 indicates a fishing rod herein shown in the form of a gun barrel provided with two opposite elongated slots, 11 indicating an upper slot and 12 the lower slot, which slots register with each other and extend substantially the entire length of the gun barrel or fishing rod. Suitable handle means 13 is herein shown associated with the fishing rod and is in the form of a gun stock. Adjacent the junction of the gun barrel with the gun stock or the fishing rod with the handle thereof is positioned and suitably supported thereby a fishing reel 14 of any usual or preferred form. Upon and from the reel is adapted to be wound and unwound a fishing line 15 slidably supported by the rod or gun barrel. Preferably extending transversely through said barrel to provide projecting portions beyond said barrel is a line carrying member 16 provided with an upper bridge portion 17 over which a line passes and against which the bait 18 is adapted to bear. The barrel 10 supports an elongated trough 19, which trough is semi-circular in cross section and is positioned upon both sides of the upper slot 11, and said trough is adapted to guide the bait and retain the same upon said barrel.

The power means for moving the carrying member 16 such that the same will unreel the line 15 and project the bait 18 from the rod for casting purposes is herein shown as comprising a compression spring 20 which normally tends to project the line carrying member 16 from the dotted line position shown in Fig. 3 to the muzzle end of the barrel. Also associated with said line carrying member is a tension spring 21 suitably secured to the carrying member 16 and to a supporting hook 22, which hook is rotatably supported in the closure cap 23, which closure cap has a threaded engagement with the end of the barrel 10, whereby the tension of the spring 21 may be adjusted. Thus both springs in the throwing movement of the line carrying member will assist each other to move said member; while in the return movement of said line carrying member, both springs will resist said return movement. Either of those springs may be omitted and the device will still operate, or equivalent means may be used, but when both springs are used, an improved and balanced construction is secured by positioning the tension spring and a compression spring within the barrel.

The line carrying member 16 has a depending projection 25 which carries a pin 26 and a pair of inclined cam faces 27 at opposite sides thereof. At the breech end of the barrel, there is suitably secured a pair of inclined cam faces 28 which cooperate with the inclined cam faces 27 on the line carrying member 16 to act as a drag in the initiatory movement of the line carrying member when released to the action of the power means hereinbefore described. Also positioned adjacent the breech portion of the fishing rod is a pivotally supported bell crank 29, one arm of which bears against a spring 30 and which tends to force the other arm against the barrel. The other arm of the bell crank 29 terminates in a catch portion 31 which is adapted to engage the pin 26 to retain the line carrying member in the retracted position adjacent the reel, as shown in dotted lines in Fig. 3. Tripping of the bell crank 29 upon its pivot by engaging the spring pressed end thereof releases the pin 26 from the catch 31, and thereby releases the line carrying member 16 to the action of the power means, but in the initiatory movement of said line carrying member the cam means acts as a drag and gradually releases said line carrying member such that sudden snapping or jerking of the line is substantially eliminated, thereby preventing snapping or tearing of the line in the unreeling thereof. The line carrying member 16 is moved from the outer free end of the fishing rod or gun barrel to the breech position thereof, as shown dotted in Fig. 3, by grasping the lower end 25 and retracting the same.

The invention claimed is:

1. The combination with a fishing rod, and a reel supported thereby, of a line carrying member slidably supported upon said rod and adapted to move the bait means along said rod, means for moving said line carrying member to cause the same to throw the bait, and means for retarding said line carrying member in the initiatory movement thereof.

2. The combination of a tubular fishing rod having oppositely positioned longitudinally extending slots, a reel supported by said rod, a line carrying member slidably supported upon said tubular rod and extending transversely through the rod and positioned in said slots and adapted to move the bait means along said rod, and power means within said tubular rod for moving said line carrying member to cause the same to throw the bait.

3. The combination with a tubular fishing rod having oppositely positioned longitudinally extending slots, a reel supported by said rod, a line carrying member slidably supported upon said tubular rod and extending transversely through the rod and positioned in said slots and adapted to move the bait means along said rod, and uni-directional means within said tubular rod upon both sides of said line carrying member for moving the same to cause said member to throw the bait.

4. The combination of a tubular fishing rod having oppositely positioned longitudinally extending slots, a trough positioned upon said rod and having a slot communicating with one of said tubular slots, a reel supported by said rod a line carrying member slidably supported in said trough having a portion extending transversely through the rod and positioned in said slots and adapted to move the bait means along said trough, means within said tubular rod for moving said line carrying member to cause the same to throw the bait, and releasable latch means associated with the extended end of the line carrying member.

In witness whereof, I have hereunto affixed my signature.

EDWARD M. BOGGESS.